United States Patent
Yan et al.

(10) Patent No.: US 12,112,884 B2
(45) Date of Patent: Oct. 8, 2024

(54) METHOD FOR IMPROVING CORROSION RESISTANCE OF NEODYMIUM-IRON-BORON MATERIALS BY LOW-TEMPERATURE OXIDATION AND/OR NITRIDATION TREATMENT

(71) Applicant: ZHEJIANG UNIVERSITY, Hangzhou (CN)

(72) Inventors: Mi Yan, Hangzhou (CN); Jiaying Jin, Hangzhou (CN); Wang Chen, Hangzhou (CN); Chen Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 142 days.

(21) Appl. No.: 17/711,551

(22) Filed: Apr. 1, 2022

(65) Prior Publication Data
US 2023/0282414 A1  Sep. 7, 2023

(30) Foreign Application Priority Data
Mar. 2, 2022  (CN) .......................... 202210199160.8

(51) Int. Cl.
*H01F 41/02*  (2006.01)
*C21D 8/12*  (2006.01)
*H01F 1/057*  (2006.01)

(52) U.S. Cl.
CPC ......... *H01F 41/026* (2013.01); *C21D 8/1255* (2013.01); *H01F 1/057* (2013.01)

(58) Field of Classification Search
CPC ...... H01F 1/057; H01F 1/0577; C21D 8/1255
See application file for complete search history.

(56) References Cited

U.S. PATENT DOCUMENTS 4,837,114 A * 6/1989 Hamada ................ H01F 1/0572
427/127

OTHER PUBLICATIONS

QMachine translation of Oingkai wang et al. [CN104240886A] (Year: 2012).*

* cited by examiner

*Primary Examiner* — Brian D Walck
*Assistant Examiner* — Nazmun Nahar Shams

(57) ABSTRACT

A method for improving the corrosion resistance of NdFeB materials is provided. The method includes in-situ growing a layer of oxide, nitride, or oxynitride on the surface of NdFeB magnet correspondingly by performing at least one of an oxidation treatment and a nitridation treatment at low temperature in a range of 200~400° C., thereby significantly improving the corrosion resistance of the magnet. The method is simple to operate, low-cost, green, safe, and efficient. Depending on the parameters of the low-temperature oxidation and/or nitridation treatment, the thickness of the oxide, nitride, or oxynitride layer is adjustable from 10 nm to 100 μm, which can improve the corrosion resistance of the magnet while maintaining excellent magnetic properties. Moreover, the thin surface layer is in-situ grown on the NdFeB substrate, which is strong and stable over a long service period and can be applied for mass production.

3 Claims, No Drawings

METHOD FOR IMPROVING CORROSION RESISTANCE OF NEODYMIUM-IRON-BORON MATERIALS BY LOW-TEMPERATURE OXIDATION AND/OR NITRIDATION TREATMENT

TECHNICAL FIELD

The disclosure relates to technical fields of corrosion protection, and more particularly to a method for improving corrosion resistance of neodymium-iron-boron (NdFeB) materials by low-temperature oxidation and/or nitridation treatment.

BACKGROUND

NdFeB permanent magnetic material exhibits excellent comprehensive magnetic properties such as high coercivity, high remanence, high magnetic energy product, etc. It is the most widely used rare earth permanent magnetic material and has developed into one of the key basic materials for the national economy and national defense, including new energy, rail transportation, electronic information, and aerospace. Despite the strongest magnetic performance, the shortcoming of vulnerable corrosion seriously restrains the application of NdFeB in important fields such as offshore wind power, national defense, and military industry. It has been found that the main reason for the low corrosion resistance of the NdFeB material is the low electrode potential of the Nd-rich grain boundary phase, which is preferentially corroded, induces the intergranular corrosion and the detachment of the ferromagnetic $Nd_2Fe_{14}B$ main phase grains. Eventually, the NdFeB magnet faces magnetic failure.

To improve the corrosion resistance of the NdFeB materials, researchers focused on two strategies including the alloying components and surface protection in the past. To maintain the tetragonal structure of $Nd_2Fe_{14}B$ main phase to ensure excellent magnetic properties, the improvement of corrosion resistance by adjusting the composition of NdFeB alloy is very limited. Surface protection requires complex and multiple-step electroplating, chemical plating, or electrophoresis of NdFeB magnets, which increases the production cost and causes environmental pollution. Meanwhile, the weak interface bonding between the plate and the NdFeB substrate leads to the problem of long-term protection in practical applications. Therefore, how to improve the corrosion resistance of NdFeB magnets has been a common challenge for the community of rare earth permanent magnetic material.

SUMMARY

A purpose of the disclosure is to overcome deficiencies of the prior art and provide a method for improving corrosion resistance of NdFeB materials by low-temperature oxidation and/or nitridation treatment.

The disclosure uses a low-temperature oxidation and/or nitridation treatment method to in-situ grow at least one selected from a group consisting of an oxide thin layer, a nitride thin layer and an oxynitride thin layer on the surface of NdFeB magnet to significantly improve the corrosion resistance. The method specifically includes: vacuumizing to $10^{-2} \sim 10^{-4}$ pascals (Pa) in a tube furnace or an atmosphere furnace, then introducing gas with a flow rate in a range of 15~5000 milliliters per minute (mL/min). The gas is at least one selected a group consisting of oxygen ($O_2$), nitrogen ($N_2$), ammonia gas ($NH_3$) and water vapor, a temperature of the at least one of the low-temperature oxidation treatment and the low-temperature nitridation treatment is controlled in a range of 200~400 degrees Celsius (° C.), and a reaction time is controlled in a range of 0.5~24 hours.

In an embodiment, a thickness of the at least one selected from the group consisting of the oxide thin layer, the nitride thin layer and the oxynitride thin layer is continuously adjustable in a range from 10 nanometers (nm) to 100 micrometers (μm).

In an embodiment, components of the NdFeB magnet, in terms of atomic percent, are $(RE_aRE'_{1-a})_x(Fe_bM_{1-b})_{100-x-y-z}M'_yB_z$, where RE is at least one of lanthanide elements except lanthanum (La), cerium (Ce) and yttrium (Y); RE' is at least one selected from a group consisting of La, Ce and Y; Fe is iron; M is one or two of cobalt (Co) and nickel (Ni); M' is at least one selected from a group consisting of niobium (Nb), zirconium (Zr), tantalum (Ta), vanadium (V), aluminum (Al), copper (Cu), gallium (Ga), titanium (Ti), chromium (Cr), molybdenum (Mo), manganese (Mn), argentum (Ag, also referred to silver), aurum (Au, also referred to gold), plumbum (Pb, also referred to lead) and silicon (Si); B is boron; and a, b, x, y, and z respectively satisfy conditions including: $0.55 \le a \le 1$, $0.8 \le b \le 1$, $12 \le x \le 18$, $0 \le y \le 2$, and $5.5 \le z \le 6.5$.

Compared with the prior art, embodiments of the disclosure have at least beneficial effects as follows.

1) The traditional method to improve the corrosion resistance is based on the long-term understanding of low-potential Nd-rich phase. The components of the Nd-rich phase are tailored by alloying to lower the potential difference between the Nd-rich phase and the $Nd_2Fe_{14}B$ main phase, or the direct contact between Nd-rich phase and corrosion solution is prohibited by plating the protective coatings such as Cu and Ni on the surface of the magnet. Different from the traditional methods, the biggest technological innovation of the disclosure is to take full advantage of easy oxidation or nitridation characteristics of the Nd-rich phase containing high concentration of rare earth elements. A thin layer of oxide, nitride or oxynitride with high electrode potential is formed on the surface of the NdFeB magnet through low-temperature oxidation/nitridation treatment, which is chemically stable and dense as powerful surface protection to increase the corrosion potential and decrease the corrosion current.

2) The composition, structure, fraction, and distribution of Nd-rich phase in NdFeB magnets are varied due to the different contents of high-abundance rare earth La, Ce, Y, transition metals Fe, Co, Ni, and other alloying elements. The corresponding oxidation/nitridation parameters are delicately tailored to realize the common goal of greatly improved corrosion resistance of NdFeB magnets.

3) The thickness of the thin layer of oxide, nitride or oxynitride in-situ grown on the magnet surface is continuously adjustable in a range from 10 nm to 100 μm, which can improve the corrosion resistance and simultaneously maintain the excellent magnetic properties of the NdFeB magnets with different dimensions (from thin magnets of mm level to bulk magnets of ≥10 cm level).

4) The in-situ grown thin layer of oxide, nitride or oxynitride has a stronger interface bonding with the NdFeB substrate, which can ensure sufficient long lifetimes.

5) Compared with the traditional vacuum or inert gas protection heat treatment of NdFeB at high temperature (450~1050° C.), the one-step oxidation/nitridation atmosphere treatment at low temperature (200~400° C.) is required, which is relatively simple and low-cost.

6) NdFeB magnets after oxidation/nitridation treatment can be free from subsequent plating treatment such as electroplating or chemical plating, which can reduce environmental pollution.

DETAILED DESCRIPTION OF EMBODIMENTS

The disclosure is further described below in relation to specific embodiments, but the disclosure is not limited to the following embodiments.

Embodiment 1

Components of neodymium-iron-boron (NdFeB) magnet, in terms of atomic percent, are $(Pr_{0.2}Nd_{0.8})_{14}Fe_{78.95}(Cu_{0.5}Al_{0.2}Ga_{0.2}Zr_{0.1})_1B_{6.05}$. After vacuumizing to $2\times10^{-2}$ Pascals (Pa) in a tube furnace, oxygen ($O_2$) is introduced with a flow rate of 800 milliliters per minute (mL/min), a temperature of low-temperature oxidation is controlled at 350 degrees Celsius (° C.), and a reaction time is controlled at 3 hours. A thickness of an oxide thin layer in-situ grown on the magnet surface is 1 micrometer (μm). Test results of AMT-4 permanent magnet characteristic measuring instrument show that the remanence of the magnet after surface oxidation treatment is 14.0 kilogauss (KG) and the coercivity is 14.8 kilo-oersted (kOe). Test results of AMETEK electrochemical workstation show that corrosion current of the magnet in 3.5% sodium chloride (NaCl) solution after surface oxidation treatment is 5 microamperes per square centimeter ($\mu A/cm^2$).

Comparative Embodiment 1

The difference with the embodiment 1 is that the magnet is not treated with low-temperature oxidation. Test results of AMT-4 permanent magnet characteristic measuring instrument show that the remanence of the magnet is 14.0 kG and the coercivity is 14.9 kOe, which are similar to the embodiment 1. Test results of AMETEK electrochemical workstation show that the corrosion current of the magnet in 3.5% NaCl solution is 70 $\mu A/cm^2$, which is more than one order of magnitude larger than that of the embodiment 1.

Comparative Embodiment 2

The difference from the embodiment 1 is that copper (Cu) content is increased and the components of the magnet, in terms of atomic percent, are $(Pr_{0.2}Nd_{0.8})_{14}Fe_{77.95}(Cu_{1.5}Al_{0.2}Ga_{0.2}Zr_{0.1})_1B_{6.05}$, and the magnet is not treated with low-temperature oxidation. Test results of AMT-4 permanent magnet characteristic measuring instrument show that the remanence of the magnet is 13.6 kG and the coercivity is 11.7 kOe, which are significantly decreased compared to the embodiment 1. Test results of AMETEK electrochemical workstation show that the corrosion current of the magnet in 3.5% NaCl solution is 52 $\mu A/cm^2$, which is more than one order of magnitude larger than that of the embodiment 1.

Comparative Embodiment 3

The difference with the embodiment 1 is that the magnet is not treated with low-temperature oxidation and is performed surface coating treatment with a bright silver-copper-nickel coating with thickness of 10 μm. Test results of AMT-4 permanent magnet characteristic measuring instrument show that the remanence of the magnet is 13.7 kG and the coercivity is 14.2 kOe, which are decreased compared to the embodiment 1. Test results of AMETEK electrochemical workstation show that the corrosion current of the magnet in 3.5% NaCl solution is 10 $\mu A/cm^2$, which is larger than that of the embodiment 1.

Embodiment 2

Components of NdFeB magnet, in terms of atomic percent, are $[Nd_{0.65}(La_{0.35}Ce_{0.65})_{0.35}]_{16}(Fe_{0.97}Co_{0.03})_{76.15}(Ga_{0.35}Cu_{0.2}Al_{0.2}Nb_{0.1}Zr_{0.05})_2B_{5.85}$. After vacuumizing to $3\times10^{-3}$ Pa in a tube furnace, $O_2$ is introduced with a flow rate of 200 mL/min, a temperature of low-temperature oxidation is controlled at 300° C., and a reaction time is controlled at 0.5 hours. A thickness of an oxide thin layer in-situ grown on the magnet surface is 200 nanometers (nm). Test results of AMT-4 permanent magnet property measuring instrument show that the remanence of the magnet after surface oxidation treatment is 12.4 kG and the coercivity is 11.1 kOe. Test results of AMETEK electrochemical workstation show that corrosion voltage of the magnet in 3.5% NaCl solution after surface oxidation treatment is −430 millivoltages (mV).

Comparative Embodiment 4

The difference with the embodiment 2 is that the magnet is not treated with low-temperature oxidation. Test results of AMT-4 permanent magnet characteristic measuring instrument show that the remanence of the magnet is 12.4 kG and the coercivity is 11.2 kOe, which are similar to the embodiment 2. Test results of AMETEK electrochemical workstation show that the corrosion potential of the magnet in 3.5% NaCl solution is −870 mV, which is significantly lower than that of the embodiment 2.

Embodiment 3

Components of NdFeB magnet, in terms of atomic percent, are $(Pr_{0.2}Nd_{0.8})_{18}Fe_{75.55}(Ga_{0.7}Al_{0.15}Zr_{0.15})_{0.55}B_{5.9}$. After vacuumizing to $2\times10^{-4}$ Pa in an atmosphere furnace, ammonia gas ($NH_3$) is introduced with a flow rate of 80 mL/min, a temperature of low-temperature nitridation is controlled at 400° C. and a reaction time is controlled at 1 hour. A thickness of a nitride layer in-situ grown on the magnet surface is 300 nm. Test results of AMT-4 permanent magnet characteristic measuring instrument show that the remanence of the magnet after surface nitridation treatment is 13.6 kG and the coercivity is 17.5 kOe. Test results of AMETEK electrochemical workstation show that the corrosion current of the magnet in 3.5% NaCl solution after surface nitridation treatment is 11 $\mu A/cm^2$.

Comparative Embodiment 5

The difference with the embodiment 3 is that the magnet is not treated with low-temperature nitridation. Test results of AMT-4 permanent magnet characteristic measuring instrument show that the remanence of the magnet is 13.5 KG and the coercivity is 17.4 kOe, which are similar to the embodiment 3. Test results of AMETEK electrochemical workstation show that the corrosion current of the magnet in 3.5% NaCl solution is 317 $\mu A/cm^2$, which is more than one order of magnitude larger than that of the embodiment 3.

Embodiment 4

Components of NdFeB magnet, in terms of atomic percent, are $[(Pr_{0.1}Nd_{0.9})_{0.75}(Y_{0.15}Ce_{0.85})_{0.25}]_{15}(Fe_{0.9}Co_{0.1})_{77.4}$ $(Cu_{0.3}Ga_{0.15}Al_{0.25}Si_{0.2}Nb_{0.1})_{1.5}B_{6.1}$. After vacuumizing to $1\times10^{-3}$ Pa in a tube furnace, a mixture of $O_2$ and nitrogen ($N_2$) is introduced with a ratio of 7:3 and a flow rate of 500 mL/min, a temperature of low-temperature oxidation and nitridation is controlled at 350° C. and a reaction time is controlled at 12 hour. A thickness of an oxynitride layer thin layer in-situ grown on the magnet surface is 5 μm. Test results of AMT-4 permanent magnet characteristic measuring instrument show that the remanence of the magnet after surface oxidation and nitridation treatment is 12.6 kG and the coercivity is 13.0 kOe. Test results of AMETEK electrochemical workstation show that corrosion potential of the magnet in 3.5% NaCl solution after surface oxidation and nitridation treatment is −240 m V.

Comparative Embodiment 6

The difference with the embodiment 4 is that the magnet is not treated with low-temperature oxidation and nitridation treatment. Test results of AMT-4 permanent magnet characteristic measuring instrument show that the remanence of the magnet is 12.6 kG and the coercivity is 13.3 kOe, which are similar to the embodiment 4. Test results of AMETEK electrochemical workstation show that the corrosion voltage of the magnet in 3.5% NaCl solution is-730 mV, which is significantly lower than that of the embodiment 4.

What is claimed is:

1. A method for improving corrosion resistance of neodymium-iron-boron (NdFeB) materials, consisting of:
   in-situ growing at least one selected from a group consisting of an oxide layer, a nitride layer and an oxynitride layer on a surface of a NdFeB magnet by correspondingly performing at least one of oxidation treatment and nitridation treatment of the NdFeB magnet;
   wherein the "performing at least one of the oxidation treatment and the nitridation treatment" consists of:
   providing the NdFeB magnet in a tube furnace or an atmosphere furnace;
   vacuumizing to $10^{-2}$-$10^{-4}$ pascals (Pa) in the tube furnace or the atmosphere furnace;
   introducing at least one selected a group consisting of oxygen ($O_2$), nitrogen ($N_2$), ammonia gas ($NH_3$) and water vapor with a flow rate in a range of 200-5000 milliliters per minute (mL/min) into the tube furnace or the atmosphere furnace; and
   controlling a temperature of the at least one of the oxidation treatment and the nitridation treatment in a range of 300-350 degrees Celsius (° C.) for 0.5-24 hours;
   wherein the oxide layer consists of an oxide of one or more elements from the NdFeB magnet; the nitride layer consists of a nitride of one or more elements from the NdFeB magnet; and the oxynitride layer consists of an oxynitride of one or more elements from the NdFeB magnet.

2. The method according to claim 1, wherein a thickness of the at least one selected from the group consisting of the oxide, the nitride and the oxynitride layer is adjustable in a range from 10 nanometers (nm) to 100 micrometers (μm).

3. The method according to claim 1, wherein components of the NdFeB magnet, in atomic percent, are $(RE_aRE'_{1-a})_x(Fe_bM_{1-b})_{100-x-y-z}M'_yB_z$,
   where RE is neodymium (Nd) or a mixture of neodymium (Nd) and at least one of lanthanide elements except lanthanum (La), cerium (Ce) and yttrium (Y); RE' is at least one selected from a group consisting of La, Ce and Y; Fe is iron; M is one or two of cobalt (Co) and nickel (Ni); M' is at least one selected from a group consisting of niobium (Nb), zirconium (Zr), tantalum (Ta), vanadium (V), aluminum (Al), copper (Cu), gallium (Ga), titanium (Ti), chromium (Cr), molybdenum (Mo), manganese (Mn), silver (Ag), gold (Au), lead (Pb) and silicon (Si); B is boron; and a, b, x, y, and z respectively satisfy conditions comprising: $0.55 \leq a \leq 1$, $0.8 \leq b \leq 1$, $12 \leq x \leq 18$, $0 \leq y \leq 2$, and $5.5 \leq z \leq 6.5$.

* * * * *